(12) United States Patent
Park et al.

(10) Patent No.: US 9,887,854 B2
(45) Date of Patent: Feb. 6, 2018

(54) METHOD AND APPARATUS FOR DYNAMICALLY CHANGING GROUP CONTROL MODE BY USING USER INTERVENTION INFORMATION

(71) Applicant: Samsung Electronics Co., Ltd., Suwon-si, Gyeonggi-do (KR)

(72) Inventors: Gyungmin Park, Suwon-si (KR); Changgun Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 94 days.

(21) Appl. No.: 14/861,035

(22) Filed: Sep. 22, 2015

(65) Prior Publication Data

US 2016/0099815 A1    Apr. 7, 2016

(30) Foreign Application Priority Data

Oct. 7, 2014    (KR) .................. 10-2014-0134890

(51) Int. Cl.
*H04W 4/00*    (2009.01)
*H04L 12/28*    (2006.01)

(52) U.S. Cl.
CPC ........ *H04L 12/2807* (2013.01); *H04L 12/282* (2013.01); *H04L 12/2816* (2013.01); *H04W 4/005* (2013.01)

(58) Field of Classification Search
None
See application file for complete search history.

(56) References Cited

U.S. PATENT DOCUMENTS

| 8,490,006 B1 | 7/2013 | Reeser et al. |
| 2003/0069947 A1 | 4/2003 | Lipinski |
| 2008/0082464 A1 | 4/2008 | Ozzie et al. |
| 2010/0262467 A1 | 10/2010 | Barnhill, Jr. et al. |
| 2011/0032423 A1 | 2/2011 | Jing et al. |
| 2011/0046805 A1* | 2/2011 | Bedros ................ H04L 12/2809 700/291 |
| 2013/0024799 A1 | 1/2013 | Fadell et al. |
| 2013/0103622 A1 | 4/2013 | Matsuoka et al. |
| 2014/0167929 A1 | 6/2014 | Shim et al. |

\* cited by examiner

*Primary Examiner* — Fan Ng
(74) *Attorney, Agent, or Firm* — Jefferson IP Law, LLP

(57) ABSTRACT

The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services. A method and an apparatus for dynamically changing a group control mode for operating a plurality of devices based on user intervention information according to a user's need are provided. A method of changing a group control mode using user intervention information by a home gateway includes executing the group control mode for controlling functions of a group of devices according to a predetermined setting, determining whether a user intervention condition is met, and, when the user intervention condition is met, suggesting a change to the group control mode based on pre-stored user intervention information and external environment data to a user.

22 Claims, 16 Drawing Sheets

FIG. 5

| ACCUMULATED DATA | USER INTERVENTION (A/C TEMPERATURE) | OUTSIDE TEMPERATURE | CURRENT TEMPERATURE OF AC | CURRENT TEMPERATURE OF REF | EXECUTION TIME OF GROUP CONTROL MODE |
|---|---|---|---|---|---|
| 1. | Temp. 18 DEGREES | 31 | 31 | 0 DEGREES | 18:00 |
| 2. | Temp. 18 DEGREES | 27 | 30 | 0 DEGREES | 23:00 |
| 3. | - | 20 | 20 | 0 DEGREES | 22:00 |
| 4. | - | 20 | 20 | 0 DEGREES | 18:00 |
| 5. | - | 23 | 23 | 0 DEGREES | 19:00 |
| 6. | Temp. 18 DEGREES | 33 | 32 | 0 DEGREES | 18:00 |
| 7. | Temp. 18 DEGREES | 29 | 35 | 0 DEGREES | 23:05 |

FIG. 6

| ACCUMULATED DATA | USER INTERVENTION (LED POWER OPERATION) | CURRENT STATE OF LED | CURRENT STATE OF AC | CURRENT STATE OF TV | CURRENT STATE OF W/M | CURRENT STATE OF R/C | EXECUTION TIME OF GROUP CONTROL MODE |
|---|---|---|---|---|---|---|---|
| 1. | Power Off | On | On | On | On | On | 18:00 |
| 2. | Power Off | On | On | On | On | On | 17:00 |
| 3. | - | On | On | On | On | On | 22:50 |
| 4. | - | On | On | On | On | On | 23:00 |
| 5. | - | On | On | On | On | On | 20:00 |
| 6. | Power Off | On | On | On | On | On | 17:50 |
| 7. | Power Off | On | On | On | On | On | 13:00 |

METHOD AND APPARATUS FOR DYNAMICALLY CHANGING GROUP CONTROL MODE BY USING USER INTERVENTION INFORMATION

CROSS-REFERENCE TO RELATED APPLICATION(S)

This application claims the benefit under 35 U.S.C. § 119(a) of a Korean patent application filed on Oct. 7, 2014 in the Korean Intellectual Property Office and assigned Serial number 10-2014-0134890, the entire disclosure of which is hereby incorporated by reference.

TECHNICAL FIELD

The present disclosure relates to a smart home technology. More particularly, the present disclosure relates to a method and an apparatus for dynamically changing a group control mode for operating a plurality of devices based on user intervention information in accordance with a user's demand.

BACKGROUND

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

A smart home that supports automation uses technology for automatically controlling various devices within the house such as a lighting, temperature control, and a security system. When a user's behavior or a surrounding environment meets a particular condition, a smart home executes a group control mode and, when the group control mode is executed, controls a plurality of devices according to a predetermined setting for the user's convenience.

At this time, when the user is not satisfied with the executed group control mode, the user performs user intervention to set and execute the devices again. When the user intervention has a pattern, a service of extracting the pattern and proposing the extracted pattern as a new group control mode is required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for dynamically changing a group control mode, in which a plurality of devices are operated using user intervention information, to be suitable for a user's demand.

In accordance with an aspect of the present disclosure, a method of changing a group control mode using user intervention information by a home gateway is provided. The method includes executing the group control mode for controlling functions of a group of devices according to a predetermined setting, determining whether a user intervention condition is met, and, when the user intervention condition is met, suggesting a change to the group control mode based on pre-stored user intervention information and external environment data to a user.

In accordance with another aspect of the present disclosure, a home gateway for changing a group control mode by using user intervention information is provided. The home gateway includes a transceiver for transmitting/receiving information to/from at least one of a group of devices, an environment sensor, and a user device, and a controller configured to execute the group control mode for controlling functions of the group of devices according to a predetermined setting, determine whether a user intervention condition is met, and, when the user intervention condition is met, to suggest a change to the group control mode based on pre-stored user intervention information and external environment data to a user.

According to the present disclosure, a group control module may be changed using user intervention and a user may feel a larger sense of satisfaction through the group control mode changed according to a user's demand.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 is a table in which user intervention in an air conditioning (A/C) and external environment data are recorded according to an embodiment of the present disclosure;

FIG. 6 is a table in which user intervention in an light emitting diode (LED) and external environment data are recorded according to an embodiment of the present disclosure;

Throughout the drawings, it should be noted that like reference numbers are used to depict the same or similar elements, features, and structures.

DETAILED DESCRIPTION

Figure 1:
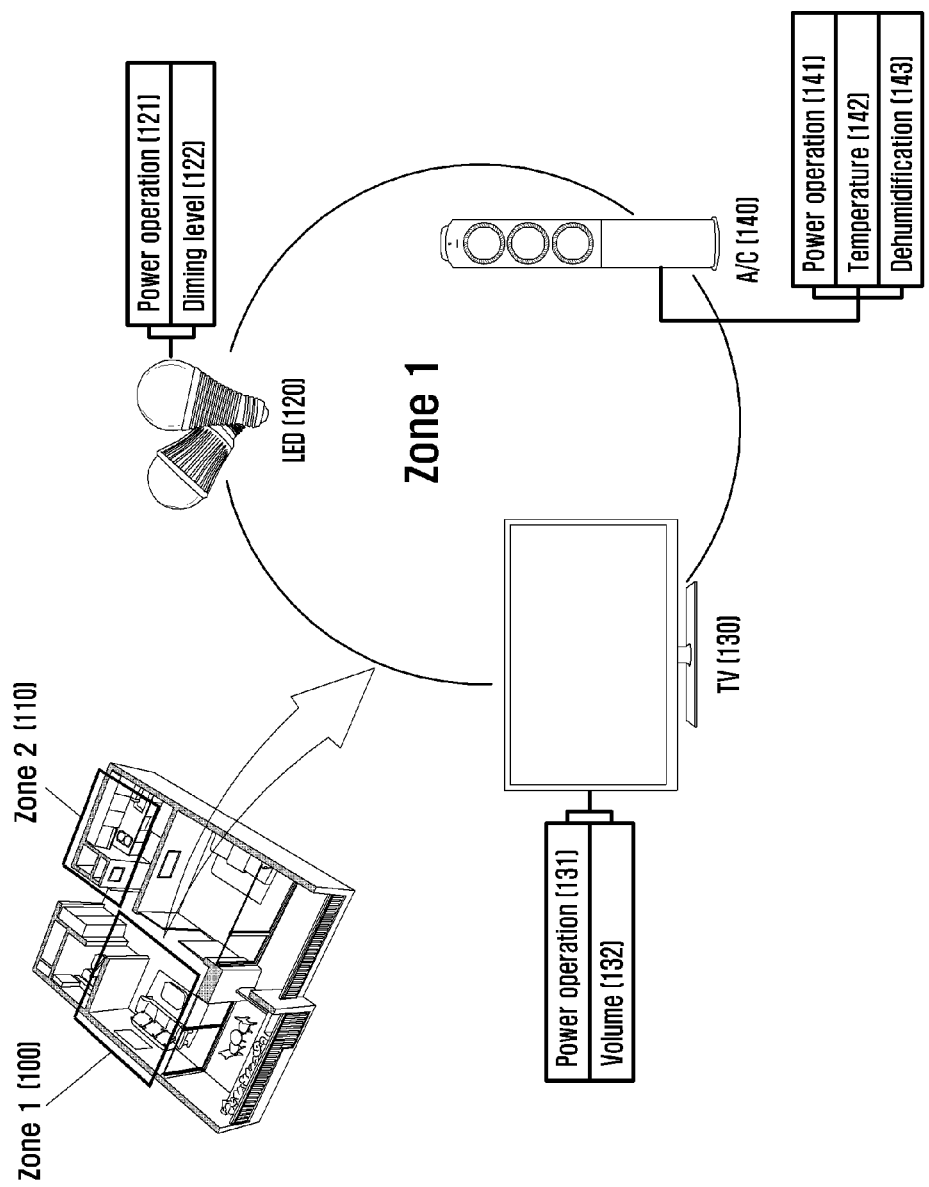
FIG. 1 illustrates a plurality of zones and a plurality of devices arranged within a house according to an embodiment of the present disclosure.

The following description with reference to the accompanying drawings is provided to assist in a comprehensive understanding of various embodiment of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the various embodiments of the present disclosure, descriptions related to technical contents which are well-known in the art to which the present disclosure pertains, and are not directly associated with the present disclosure, will be omitted. Such an omission of unnecessary descriptions is intended to prevent obscuring of the main idea of the present disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the present disclosure and ways to achieve them will be apparent with reference to embodiments as described below in detail in conjunction with the accompanying drawings. However, the present disclosure is not limited to the following embodiments and may be implemented in various different forms. The embodiments are merely provided to make the present disclosure complete and to fully inform those skilled in the art of the scope of the present disclosure, and processes included in the embodiments of the present disclosure are not necessary to be entirely performed but implementation of only some sets thereof may be enough. The present disclosure is defined by the scope of the claims. Throughout the specification, the same or like reference numerals designate the same or like elements.

The specific terms used herein are provided for ease of understanding the present disclosure, and such specific terms may be changed into other forms without departing from the spirit and scope of the present disclosure.

FIG. 1 illustrates a plurality of zones and a plurality of devices arranged within a house according to an embodiment of the present disclosure.

Referring to FIG. 1, spaces within the house may be divided into a plurality of zones, and a particular internal space physically separated or a particular internal space determined according to the purpose and user's demands may be designated as one zone. For example, zone 1 100 corresponds to a living room of the house, which is physically separated, and zone 2 110 corresponds to a kitchen used for the purpose related to a meal. Zone 1 and zone 2 may be designated as particular zones. A light emitting diode (LED) 120, a television (TV) 130, and an air conditioner (A/C) 140 may be located in zone 1.

Each of the devices has functions, also referred to herein as function resources. The functions of each device can be controlled by the user, and different devices may have the same function resources or different function resources. The function resources of the LED may include a power operation 121 and a dimming level 122, the functions of the TV may include a power operation 131 and a volume 132, and the functions of the A/C may include a power operation 140, a temperature setting 142, and a dehumidification 143. The user may directly control the functions through each device and a home gateway. The home gateway is a central control unit for inputting and processing user's behavior information and surrounding environment information and controlling devices within the house, and may be also referred to as a set-top box, a home server, a central control unit, and a gateway (G/W). The home gateway may have an intelligent service engine for executing an operation for reducing energy, identifying a surrounding environment and a user's state, and providing a service suitable for the identified surrounding environment and the user's state by controlling functions of each device.

A group control mode refers to a situation in which the home gateway controls a plurality of devices according to a predetermined content to satisfy a user's demand when a user's behavior or a surrounding environment meets a particular condition. For example, the group control mode, such as a coming home mode that is performed when a user enters the house, changes the dimming level of the LED, turns on the power of the TV, changes the temperature setting of the A/C to 25 degrees Celsius (° C.), executes a drying function of a washing and drying machine (W/M), charges a robot cleaner (R/C), and executes a food manager (REF). The food manager stores an incoming date and storage days of food in the refrigerator, informs of a storage period and an expiration date of the corresponding food, stores a location of the stored food, and shows the user a cooking method of the stored food. That is, the user returns back to the house, the home gateway detects the entrance of the user and executes the coming home group control mode to turn on the light, maintain a pleasant indoor temperature, and starts execution of function resources of various devices which the user requires.

At this time, even though the group control mode is executed, the user may not be satisfied with results of the executed group control according to a user's state or a surrounding situation. Accordingly, the user sets and executes the functions of the devices that the user is not satisfied with. For example, when an outside temperature is 31° C., the user may want the house to be cooler than usual. Accordingly, the user may feel hot at 25° C., which the A/C is set to for the coming home group control mode, and thus can control the temperature to be 18° C.

When such user intervention has a predetermined pattern, if the pattern is extracted and the extracted pattern is proposed as a new group control mode to the user, the user may feel a larger sense of satisfaction through the new group control mode suitable for the user's demand. For example, when an outside temperature is above 30° C., if the user repeatedly lowers the setting temperature of the A/C to 18° C. when the user returns to the house, the home gateway may analyze user intervention and surrounding environment information and then suggest controlling the setting temperature of the A/C to be 18° C. for the coming home group control mode. When a user's particular group control mode through the user intervention is suggested and executed, the sense of the satisfaction of the group control mode felt by the user may increase.

Hereinafter, an embodiment for changing the group control mode according to user intervention will be described. Processes included in the embodiment of the present disclosure do not have to be entirely performed but implementation of only a partial set of the processes may be enough.

Figure 2:
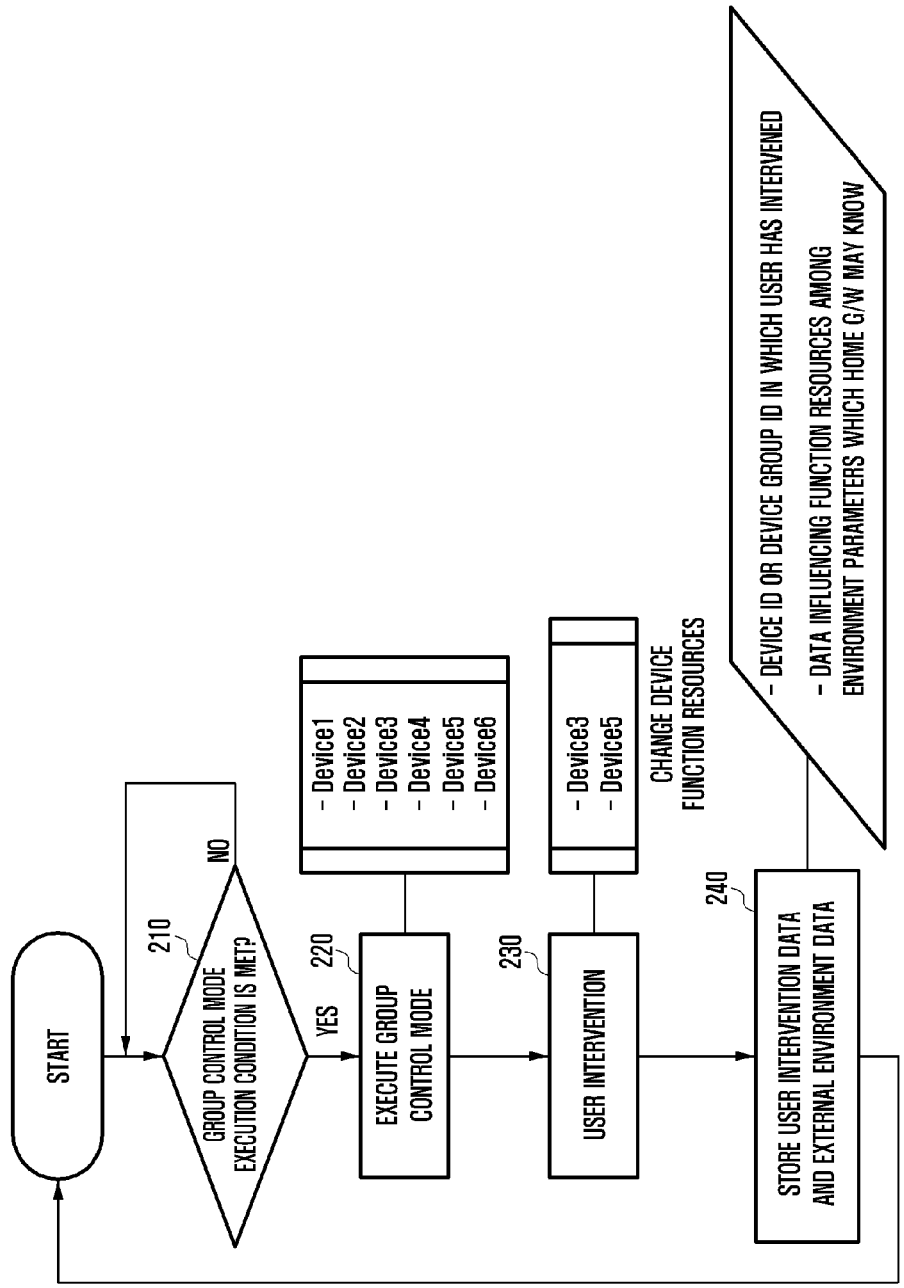
FIG. 2 illustrates a process in which a group control mode is executed and a user intervenes in the group control mode according to an embodiment of the present disclosure.

FIG. 2 illustrates a process in which a group control mode is executed and a user intervenes in the group control mode according to an embodiment of the present disclosure.

Referring to FIG. 2, when a condition for executing the group control mode is satisfied at operation 210, a particular group control mode is executed at operation 220. The group control mode controls function resources of different devices according to a predetermined setting. At this time, the user, who is not satisfied with the executed group control mode, intervenes to change the setting of the functions at operation 230. At this time, the home gateway stores user intervention information and external environment data at operation 240.

The user intervention information may include at least one device identity (ID), an ID of a device group including a plurality of devices, changed device function resources, and a setting value of changed function resources, and the external environment data may include data generated by measuring a plurality of environment parameters influencing the changed device function resources and function resource states identical or similar to changed function resources of a plurality of neighboring devices.

When the user intervention continuously performed during a particular period or accumulated a particular number of times, the home gateway analyzes a user intervention pattern based on functions resources that are changed by a user, and external environment data when the user intervention is performed. According to a result of the analysis, when both the existing condition for executing the group control mode and the particular condition under which the user repeatedly intervenes are met, the home gateway generates the changed group control mode that is suggested to the user.

Figure 3:
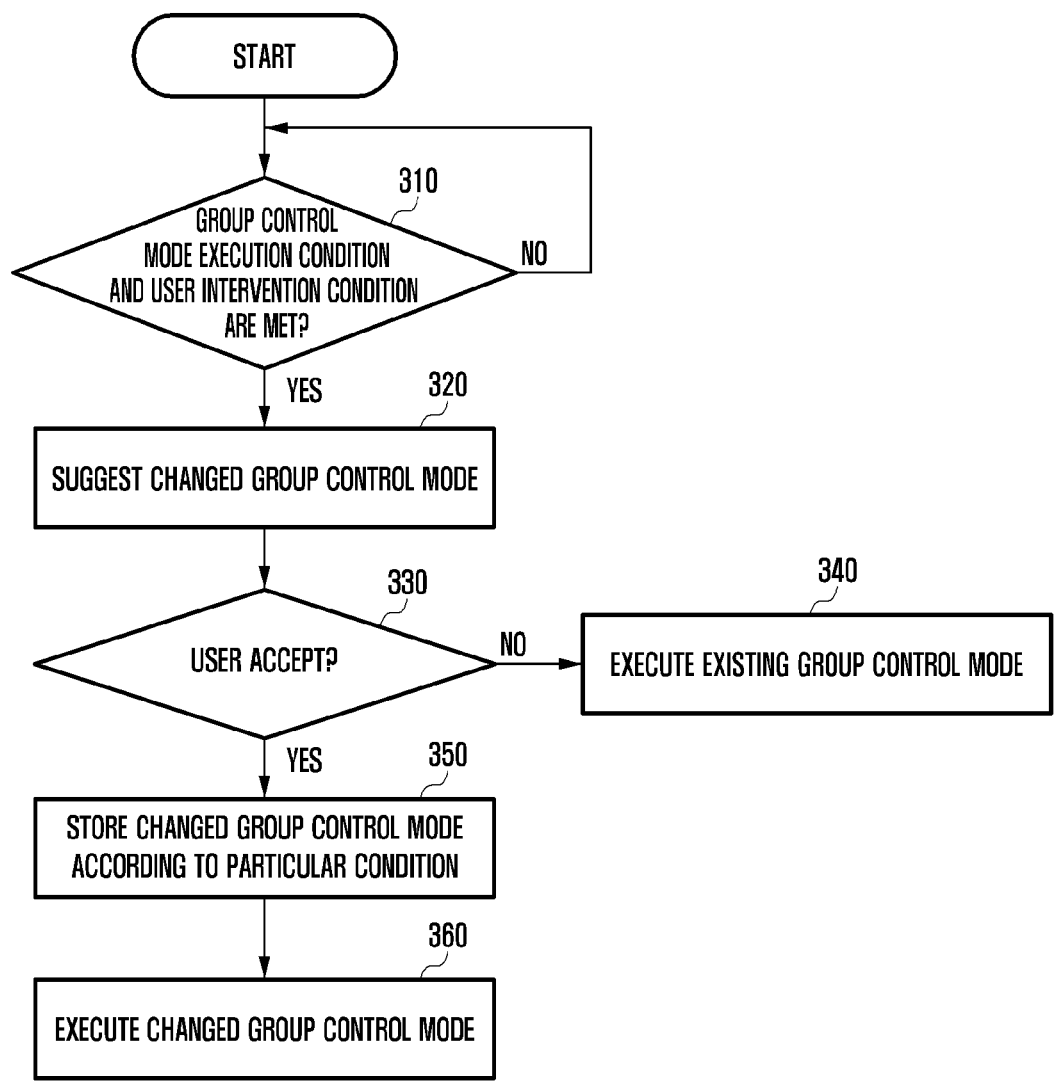
FIG. 3 illustrates a process of suggesting a changed group control mode through user intervention according to an embodiment of the present disclosure.

FIG. 3 illustrates a process of suggesting a changed group control mode through user intervention according to an embodiment of the present disclosure.

Referring to FIG. 3, when both the existing condition for executing the group control mode and the particular condition under which the user intervenes are satisfied at operation 310, the new group control mode in which the function resource setting is suggested to the user at operation 320. The user determines whether to accept the suggestion of the home gateway at operation 330. When the suggestion is accepted, the home gateway stores the changed group control mode executed according to the particular condition at operation 350 and executes the changed group control mode at operation 360. When the user does not accept the suggestion at operation 330, the home gateway executes the existing group control module at operation 340.

Figure 4:
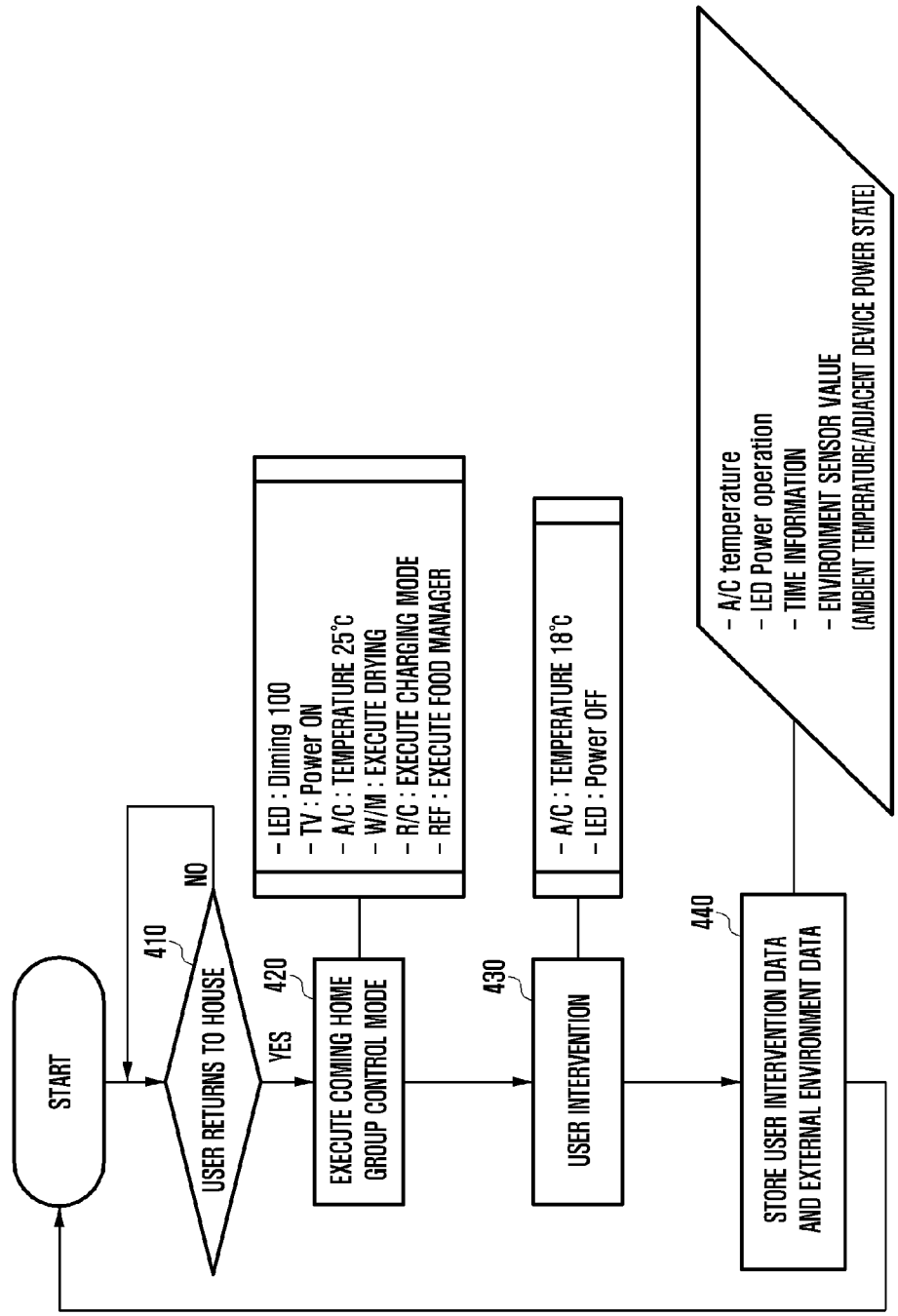
FIG. 4 illustrates an example in which a group control mode is executed and a user intervenes in the group control mode according to an embodiment of the present disclosure.

FIG. 4 illustrates an example in which the group control mode is executed and the user intervenes in the group control mode according to an embodiment of the present disclosure.

Referring to FIG. 4, when a particular condition that the user returns to the house is met at operation 410, the corresponding group control module such as coming home is executed at operation 420. The home gateway changes the dimming level of the LED, turns on power of the TV, changes the temperature setting of the A/C to 25° C., executes a drying function of the W/M, executes a charging function of the R/C, and executes the food manager REF. At this time, the user intervenes to lower the temperature setting of the A/C to 18° C. and turns off power of the LED at operation 430, and the home gateway stores user intervention data and external environment data at operation 440. Information which the home gateway stores may include the temperature setting of the A/C, the power of the LED, an outside temperature of an external environment sensor, and power operations of neighboring devices.

FIG. 5 is a table in which user intervention in an A/C and external environment data are recorded according to an embodiment of the present disclosure.

When the user lowers the temperature setting of the A/C to 18° C., the home gateway stores current temperature values of the A/C and the food manager REF and the changed temperature setting of the A/C. Further, the home gateway stores an outside temperature based on environment sensor information and current time information. The home gateway recognizes a user's pattern through the collected information.

Referring to FIG. 5, in a case of accumulated data 3, 4, and 5, the user does not change the setting temperature of the A/C and, at this time, the outside temperature is 20 to 23° C. and the temperature of the A/C is 20 to 23° C. In a case of accumulated data 1, 2, 6, and 7, the user lowers the temperature setting of the A/C to 18° C. and, at this time, the outside temperature is above 27° C. and the temperature of the A/C is above 30° C. The home gateway analyzes repetitive user intervention information on accumulated data 1, 2, 6, and 7 and, when the coming home group control mode is executed, generates a new group control mode for making a control to set the temperature setting of the A/C as 18° C. if the temperature of the A/C is higher than or equal to 30° C. or the outside temperature is higher than or equal to 27° C. When the temperature corresponds to the condition, the home gateway deletes the setting corresponding to the setting temperature of the A/C of 25° C. from the existing group control mode.

FIG. 6 is a table in which user intervention in an LED and external environment data are recorded according to an embodiment of the present disclosure.

When the user intervenes in the power of the LED, the home gateway stores power operations of devices of which power can be controlled. The home gateway stores power operations of the LED, the A/C, the TV, the W/M, and the R/C and store sensor information related to the power control from other environment sensors. Further, the home gateway stores current time information, and then recognizes a user's pattern through the stored current time information.

Referring to FIG. 6, in a case of accumulated data 3, 4, and 5, an execution time of the coming home group control mode is after 8 p.m. and, in this case, the user does not change the power of the LED in the existing group control mode. In a case of accumulated data 1, 2, 6, and 7, an execution time of the coming home group control mode is before 6 p.m. and, in this case, the user may know that power of the LED is turned off. The home gateway analyzes the repetitive user intervention information and, when the execution time of the coming home group control mode is before 6 p.m., generates a new group control mode in which the power of the LED is off. When the power operation of the LED corresponds to the condition, the setting to turn on the LED is deleted from the existing group control mode.

Figure 7:
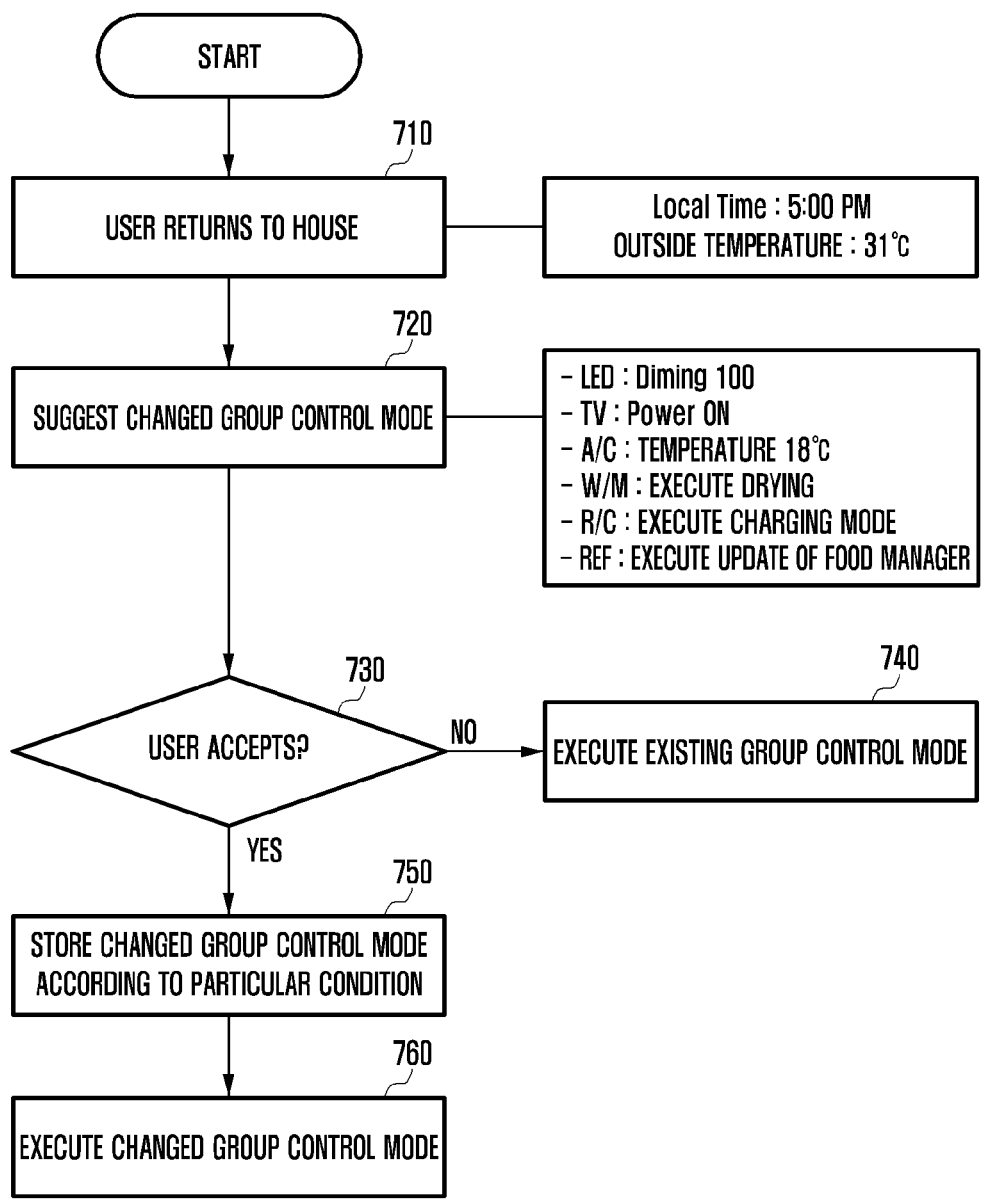
FIG. 7 illustrates an example for suggesting a changed group control mode through user intervention according to an embodiment of the present disclosure.

FIG. 7 illustrates an example for suggesting a changed group control mode through user intervention according to an embodiment of the present disclosure.

Referring to FIG. 7, the user returns to the house at 5 p.m. At this time, if an outside temperature is 31° C. at operation 710, the home gateway suggests the changed coming home group control mode to the user at operation 720. According to a result of the analysis of the user's pattern, such as the tables illustrated in FIGS. 5 and 6, the changed coming home group control mode sets the temperature setting of the A/C as 18° C. since the outside temperature is 31° C., turns off the power of the LED since the current time is 5 p.m., and executes the remaining settings such as turning on the TV, executing a drying function of the W/M, executing the charging mode of the R/C, and executing the food manager of the food manager REF. The user may identify the content of the changed coming home group control mode and determine whether to accept the changed coming home group control mode or not at operation 730. When the user accepts the changed group control mode, the home gateway stores the changed coming home group control mode as a group control mode according to a particular condition at operation 750 and executes the group control mode at operation 760. When the user does not accept the changed group control mode, the home gateway executes the existing coming home group control at operation 740.

Figure 8:
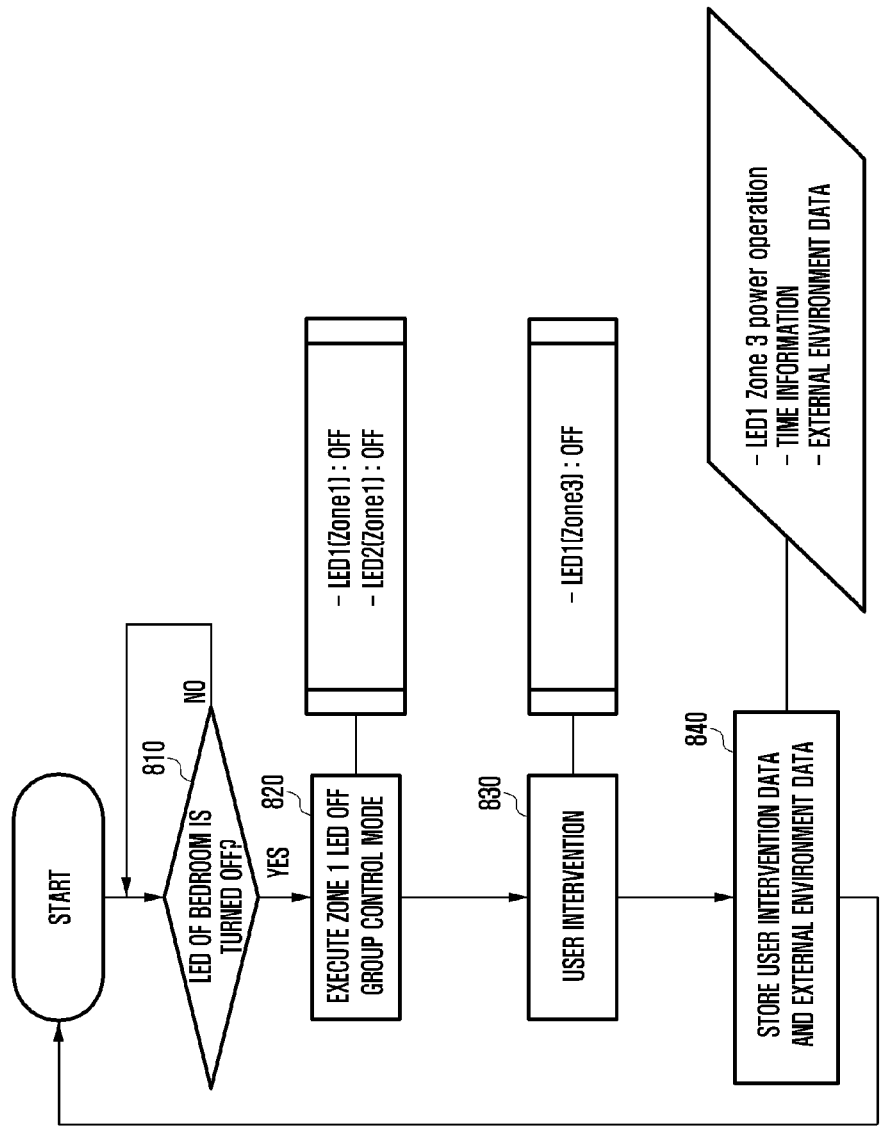
FIG. 8 illustrates an example in which a group control mode is executed and a user intervenes in the group control mode according to an embodiment of the present disclosure.

FIG. 8 illustrates an example in which a group control mode is executed and a user intervenes in the group control mode according to an embodiment of the present disclosure.

Referring to FIG. 8, illustrated is an example in which the user intervenes to control a new device that is not included in the existing group control mode and a function of the new device is added to the group control mode. When power of LED 1 is turned off at operation 810, a zone 1 LED off group control mode in which, when one of the two LEDs including LED 1 and LED 2 in zone 1 including a bedroom is turned off, the remaining other LED is also turned off is executed at operation 820. When the user repeatedly turns off LED 1 in zone 1 after turning off LED 1 in zone 3 at operation 830, the home gateway may determine the user's behavior as user intervention in the zone 1 LED off group control mode. The home gateway stores a power operation corresponding to function resources of the LED in zone 3 and also stores external environment data and time information at operation 840.

Figure 9:
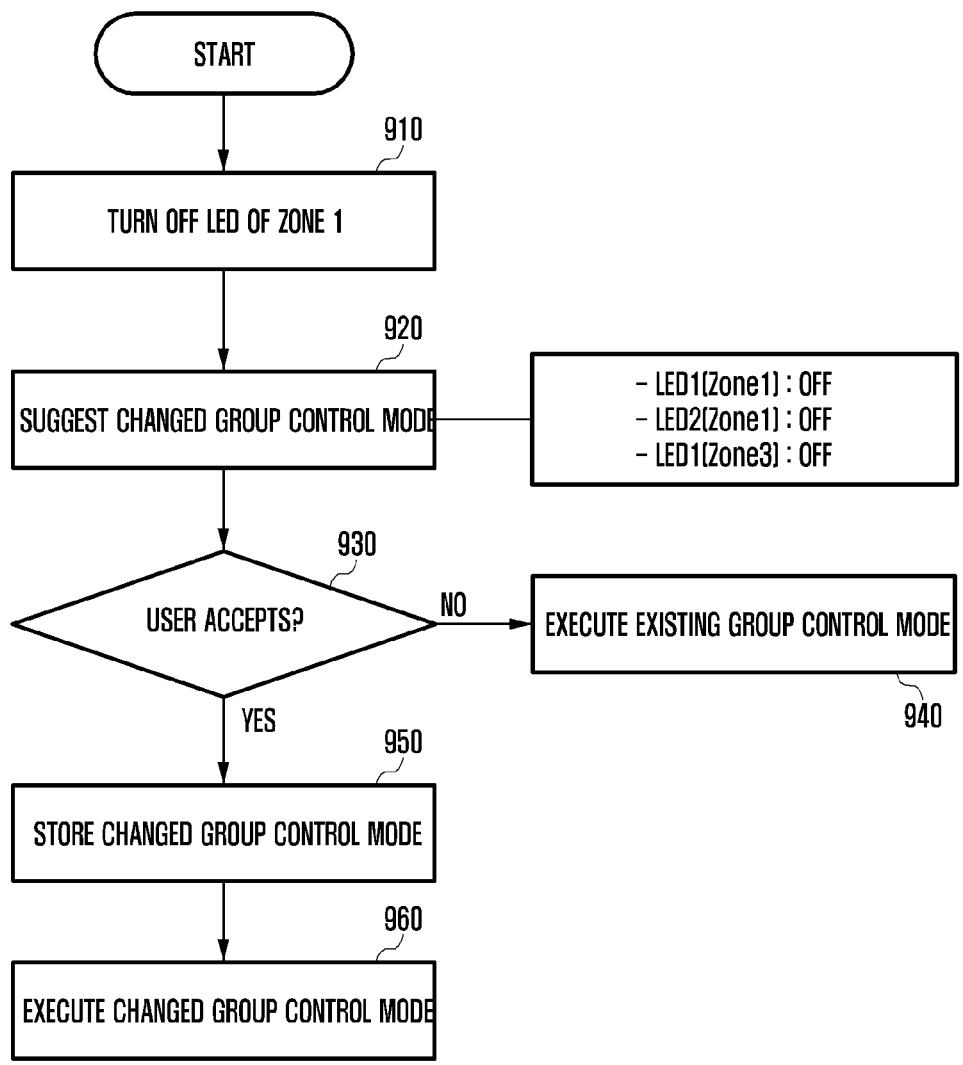
FIG. 9 illustrates an example for suggesting a changed group control mode through user intervention according to an embodiment of the present disclosure.

FIG. 9 illustrates an example for suggesting a changed group control mode through user intervention according to an embodiment of the present disclosure.

Referring to FIG. 9, illustrated is an example in which the user intervenes to control a new device that is not included in the existing group control mode and a function of the new device is added to the group control mode. When LED 1 in a bedroom is turned off at operation 910, the home gateway suggests a changed zone 1 LED off group control mode, in which LED 1 of zone 3 is also turned off when LED 1 and LED 2 in zone 1 are turned off, to the user at operation 920. The user may or may not accept the new group control mode at operation 930. When the user accepts the new group control mode at operation 930, the home gateway stores the changed zone 1 LED off group control mode at operation 950 and executes the changed zone 1 LED off group control mode at operation 960. When the user does not accept the new group control mode at operation 930, the home gateway executes the existing zone 1 LED off group control at operation 940.

In another embodiment, when the user intervenes in execution of the existing group control mode, the home gateway suggests an automatic control of a new device. In such an embodiment, the home gateway suggests the automatic control of additional function resources of a new device if the new device has function resources identical or similar to the function resources of the device controlled by the user. Alternatively, the automatic control of the additional function resources may be suggested through a matching system or an ontology system based on a particular condition. The matching system or the ontology system may be included in the control function of the home gateway. Through the suggestion, the device is also automatically executed according to the user's need, so that the user may gain larger satisfaction. Processes included in the embodiment of the present disclosure do not have be entirely performed but only a partial set of the processes may be implemented.

Figure 10:
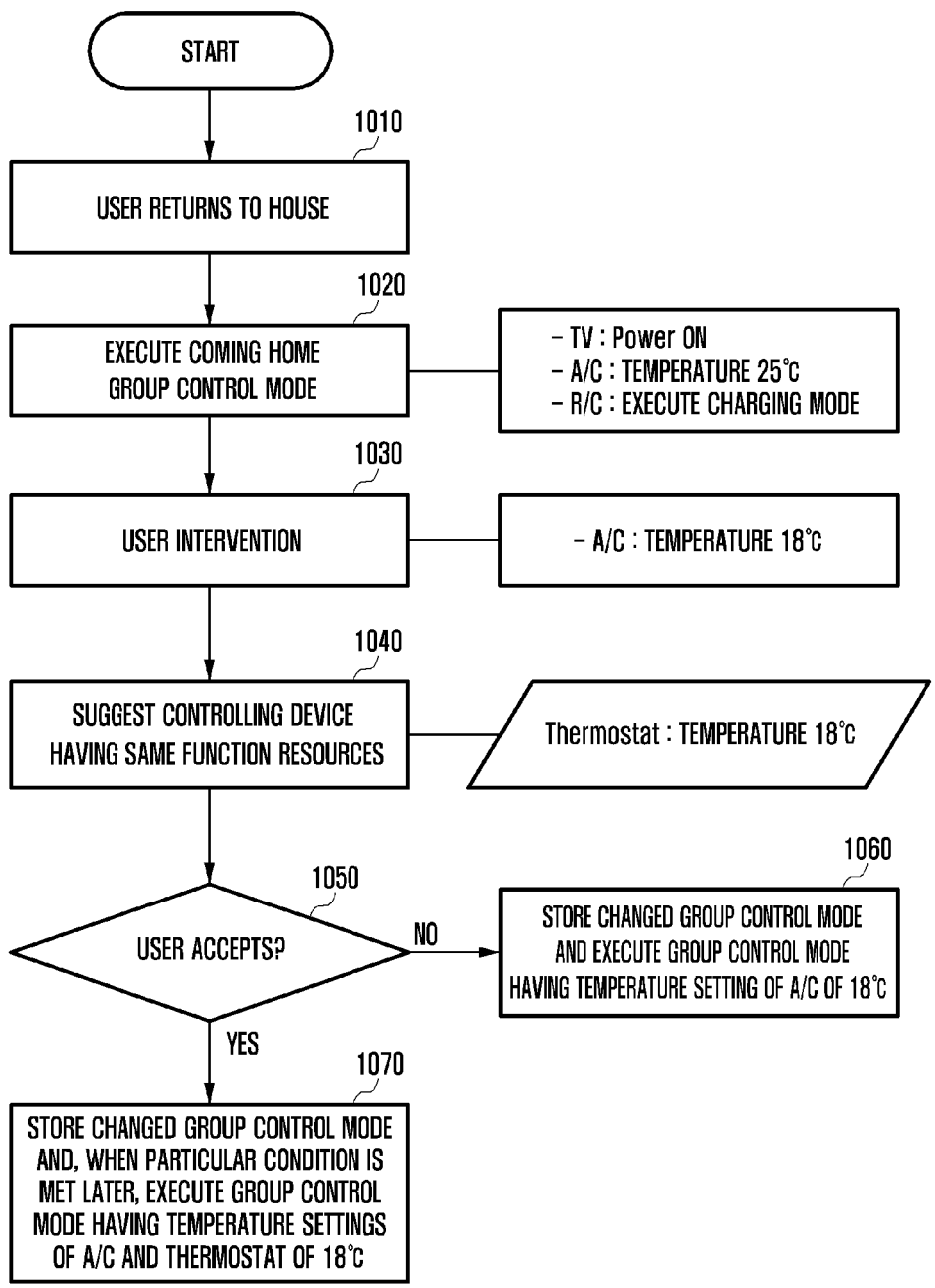
FIG. 10 illustrates an example in which a home gateway suggests an additional control of a device having the same function resources as those of the device controlled by a user through user intervention according to an embodiment of the present disclosure.

FIG. 10 illustrates an example in which a home gateway suggests an additional control of a device having the same function resources as those of the device controlled by a user through user intervention according to an embodiment of the present disclosure.

Referring to FIG. 10, when a particular condition that the user returns back to the house is met at operation 1010, the home gateway executes a coming home group control mode at operation 1020. At this time, the home gateway turns on the TV, sets the temperature setting of the A/C as 25° C., and executes the charging mode of the R/C. At this time, the user intervenes to change the temperature setting of the A/C to 18° C. at operation 1030, and the home gateway suggests an additional function resource to set a temperature setting of a house thermostat as 18° C. to the user at operation 1040. The temperature setting of the A/C in which the user intervenes and the setting temperature of the thermostat correspond to the same function resources in spite of different devices. The user may or may not accept the suggestion of the home gateway. When the user accepts the suggestion of the home gateway, the temperature setting of the thermostat of 18° C. is included and stored in the coming home group control mode as well as the setting in which the user intervenes. Thereafter, when the particular condition is met and the coming home group control mode is executed, the changed group control mode is executed to control the temperature setting of the A/C to be 18° C. and set the thermostat as 18° C. at operation 1070. When the user does not accept the suggestion of the home gateway, only the temperature setting of the A/C in which the user intervenes is included and stored in the coming home group control mode. Thereafter, when the particular condition is met and the coming home group control mode is executed, the changed group control mode is executed to control the setting temperature of the A/C to be 18° C. at operation 1060.

Figure 11:
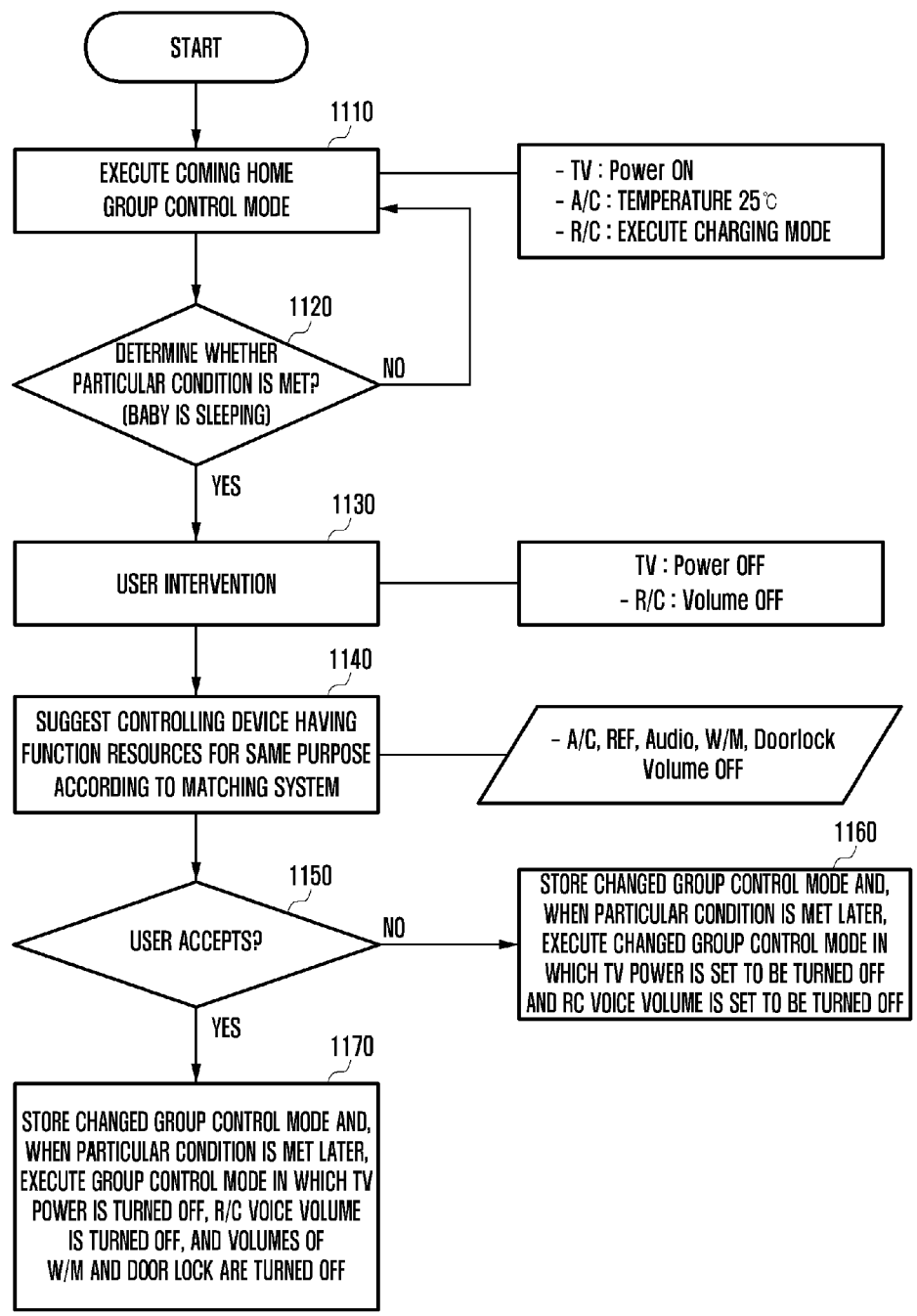
FIG. 11 illustrates an example in which a home gateway suggests an additional control of the same function resources as those of a device controlled by a user through user intervention according to an embodiment of the present disclosure.

FIG. 11 illustrates an example in which a home gateway suggests an additional control of the same function resources as those of a device controlled by a user through user intervention according to an embodiment of the present disclosure.

Referring to FIG. 11, when the user returns to the house, the coming home group control mode is executed at operation 1110. At this time, the home gateway determines whether there is an infant sleeping within the house at operation 1120. When there is an infant sleeping, the user intervenes to turn off the TV and turn off a voice volume of the R/C at operation 1130. At this time, the home gateway suggests turning off volumes of the A/C, food manager REF, an audio system, the W/M, and a door lock to the user according to the matching system of the home gateway at operation 1140. This corresponds to an additional suggestion to control a device having the same function resources of the volume to help the infant sleep. The matching system may be located in the home gateway and the user may modify and change the matching system.

The user may entirely or partially accept or may not accept the suggestion of the home gateway at operation 1150. When the user entirely or partially accepts the suggestion of the home gateway, if an infant sleeps while the coming home group control mode is executed, the changed coming home group control mode may include the infant continues sleeping and stores the setting, which the home gateway has suggested and the user has accepted, as well as the setting in which the user directly intervenes. In this scenario, the user accepts the setting to turn off the volumes of the W/M and the door lock in the suggestion of the home gateway. Thereafter, when a particular condition is met and thus the coming home group control mode is executed, if the home gateway recognizes that the infant is sleeping, the home gateway executes the changed group control mode to turn off the power of the TV, turn off the volume of the R/C, and turn off the volumes of the W/M and the door lock at operation 1170. When the user does not accept the suggestion of the home gateway and if the home gateway recognizes that the infant is sleeping, only the setting in which the user intervenes, that is, the powering the TV off and turning the volume of the R/C off is included and stored in the coming home group control mode. Thereafter, when the particular condition is met and the coming home group control mode is executed while the infant is sleeping, the changed group control mode is executed to turn off the TV the volume of the R/C at operation 1160.

Figure 12:
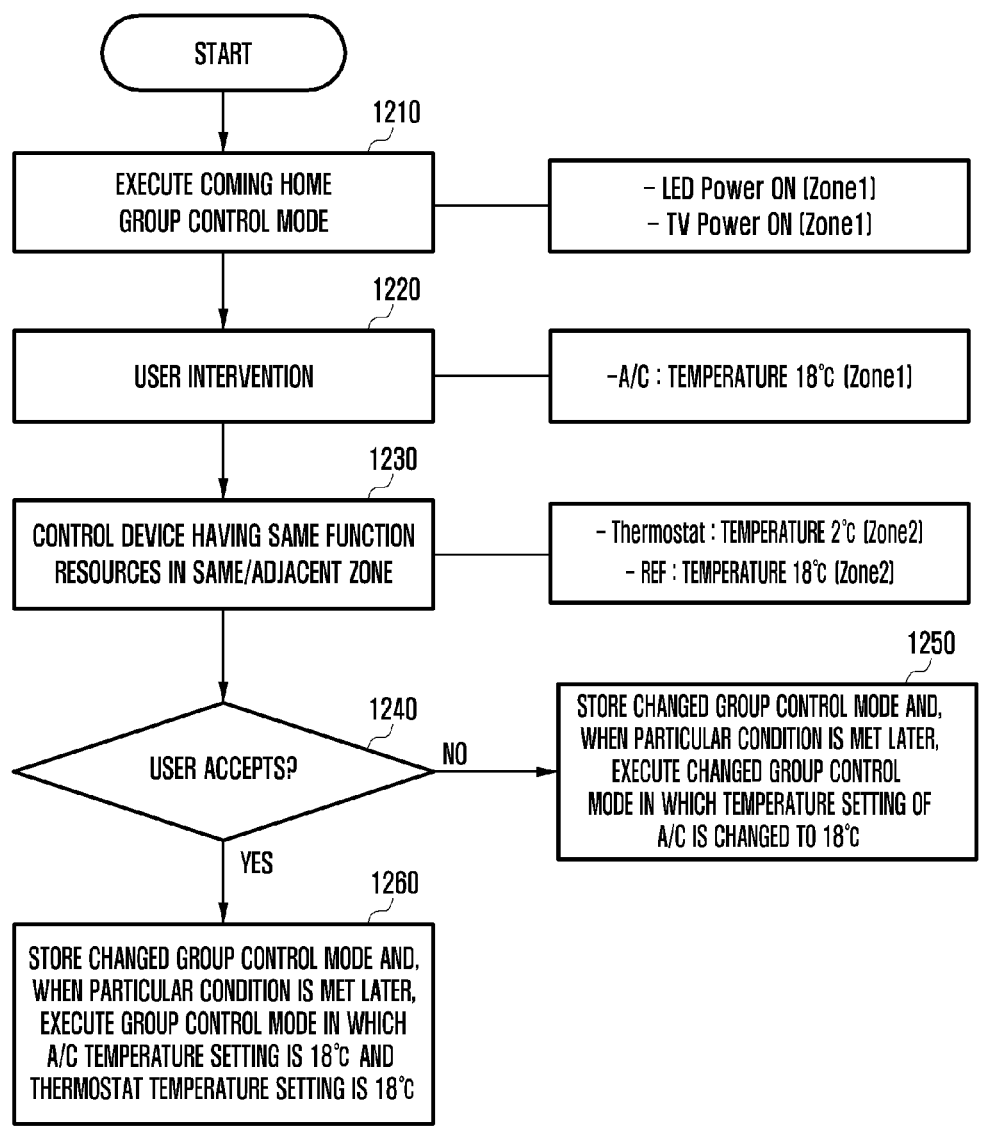
FIG. 12 illustrates an example in which a home gateway additionally suggests controlling the same function resources of devices in the same zone or an adjacent zone when a user intervenes according to an embodiment of the present disclosure.

FIG. 12 illustrates an example in which a home gateway additionally suggests controlling the same function resources of devices in the same zone or an adjacent zone when a user intervenes according to an embodiment of the present disclosure.

Referring to FIG. 12, when the user returns to the house and the coming home group control mode is executed, power of an LED in zone 1 is turned on and power of a TV in zone 1 is turned on at operation 1210. At this time, when the user intervenes to set the temperature setting of an A/C in zone 1 as 18° C. under a particular condition that the temperature is high at operation 1220, the home gateway suggests an additional control of the same function resources in the same or adjacent zone to the user. At this time, the home gateway suggests additional function resources controls to lower the setting temperature of a house thermostat in zone 2, which is adjacent to zone 1, to 18° C. and to lower the setting temperature of a food manager REF by 2° C. to the user at operation 1230.

The user may entirely or partially accept or may not accept the suggestion of the home gateway at operation 1240. At this time, when the user accepts only (partially accepts) the suggestion of the home gateway to control the temperature setting of the house thermostat to be 18° C., the changed group control mode is stored. Thereafter, when the particular condition is met, the coming home group control mode in which the setting temperature of the A/C in zone 1 and the setting temperature of the house thermostat are set as 18° C., is executed at operation 1260. When the user does not accept the suggestion of the home gateway, the changed group control mode according to the user disclosure is stored in the home gateway. Thereafter, when the particular condition is met, the group control mode in which the temperature setting of the A/C is changed to 18° C. is executed at operation 1250.

Figure 13:
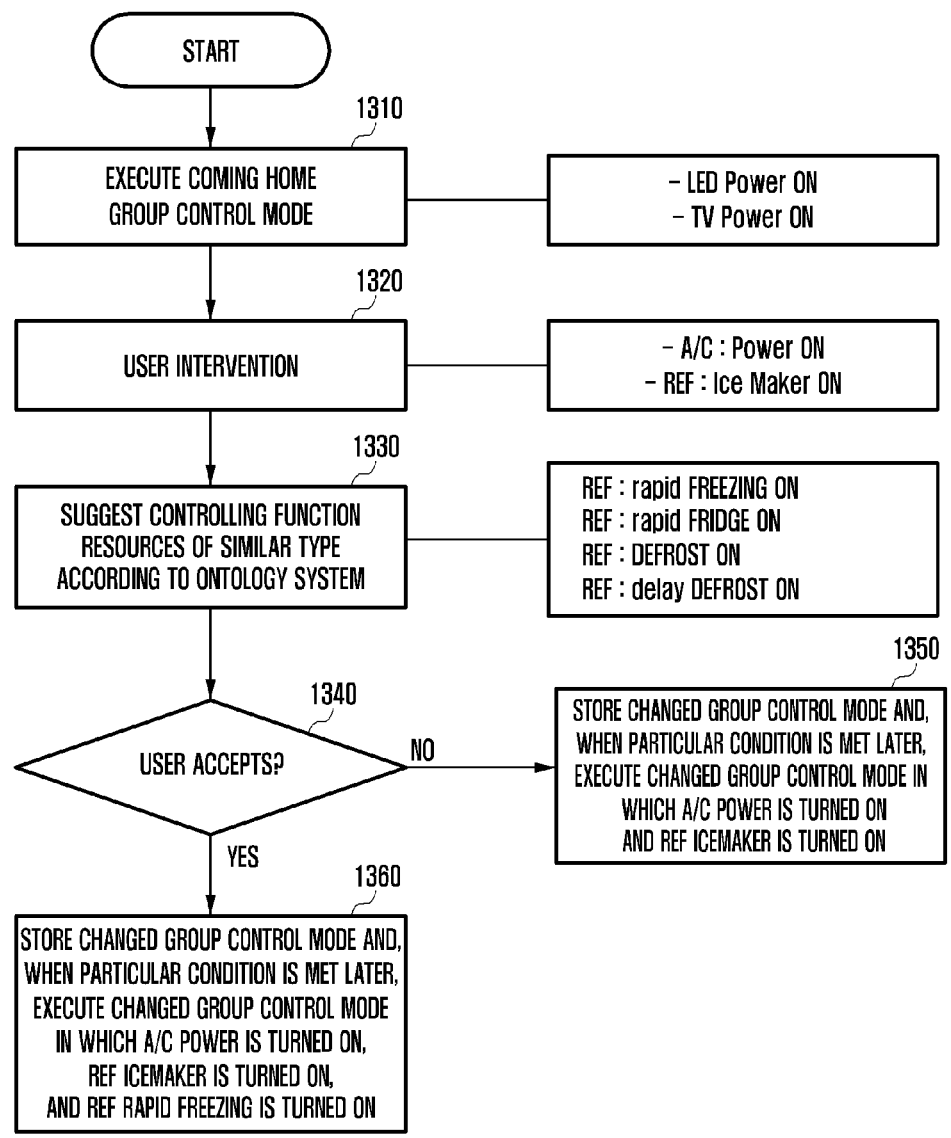
FIG. 13 illustrates an example in which a home gateway suggests an additional control of function resources related to the function resources controlled by a user according to an embodiment of the present disclosure.

FIG. 13 illustrates an example in which a home gateway suggests an additional control of function resources related to the function resources controlled by a user according to an embodiment of the present disclosure.

Ontology corresponds to a data model describing a relationship between concepts. In the present disclosure, an ontology system refers to a system that allows the home gateway to understand a user's condition and purpose based on a database storing a relationship between data to have the understanding and concept of the user's condition and controls the home gateway to execute and change the group control mode according to the user's condition and purpose. Data may be stored in the ontology system by a designer of the home gateway and may be extended according to a user's usage history.

Referring to FIG. 13, when the user returns to the house, the coming home group control mode is executed. At this time, a LED and a TV is turned on at operation 1310. Under a particular condition that the temperature is high, the user intervenes to turn on an A/C and turn on function resources of an icemaker of a food manager REF at operation 1320. The home gateway suggests an additional control of the function resources having a similar type through analysis of the user intervention. At this time, the function resources of which the setting is changed may not be identical or similar to each other and the function resources of which the additional control is suggested by the home gateway are not identical or similar to each other as well, but they have a common characteristic in that the function resources are controlled to achieve the purpose of the user's intervention in the group control mode through an analysis of the user's intervention. For example, the home gateway determines a causal relationship between hot weather and lowering the temperature setting of the A/C, and suggests turning on function resources of rapid freezing, rapid fridge, defrost, and delay defrost of the food manager REF, which correspond to the function resources required when the weather is hot, to the user at operation 1330.

The user may entirely or partially accept or may not accept the suggestion of the home gateway at operation 1340. When the user does not accept the suggestion of the home gateway at operation 1340, the home gateway stores the group control mode changed according to user intervention to turn on the A/C and the function resources of the icemaker of the food manager REF when the weather is hot at operation 1350. When the user partially accepts the suggestion of the home gateway corresponding to the function resources of the rapid freezing of the food manager REF at operation 1340, the home gateway stores the changed group control mode and, when the particular condition is met later, executes the changed group control mode to turn on the A/C and the function resources of the icemaker and the rapid freezing of the food manager REF at operation 1360.

In another embodiment, the combined group control mode corresponds to a mode in which different group control modes are combined according to a user's need, and a plurality of group control modes may be included therein. The plurality of group control modes may be located in different zones and may be executed at different times. A gateway is located in each zone and executes the group control mode by controlling function resources of the different devices, and the gateways are connected to a server that controls the combined group control mode or a combined gateway (hereinafter, referred to as the server).

Figure 14:
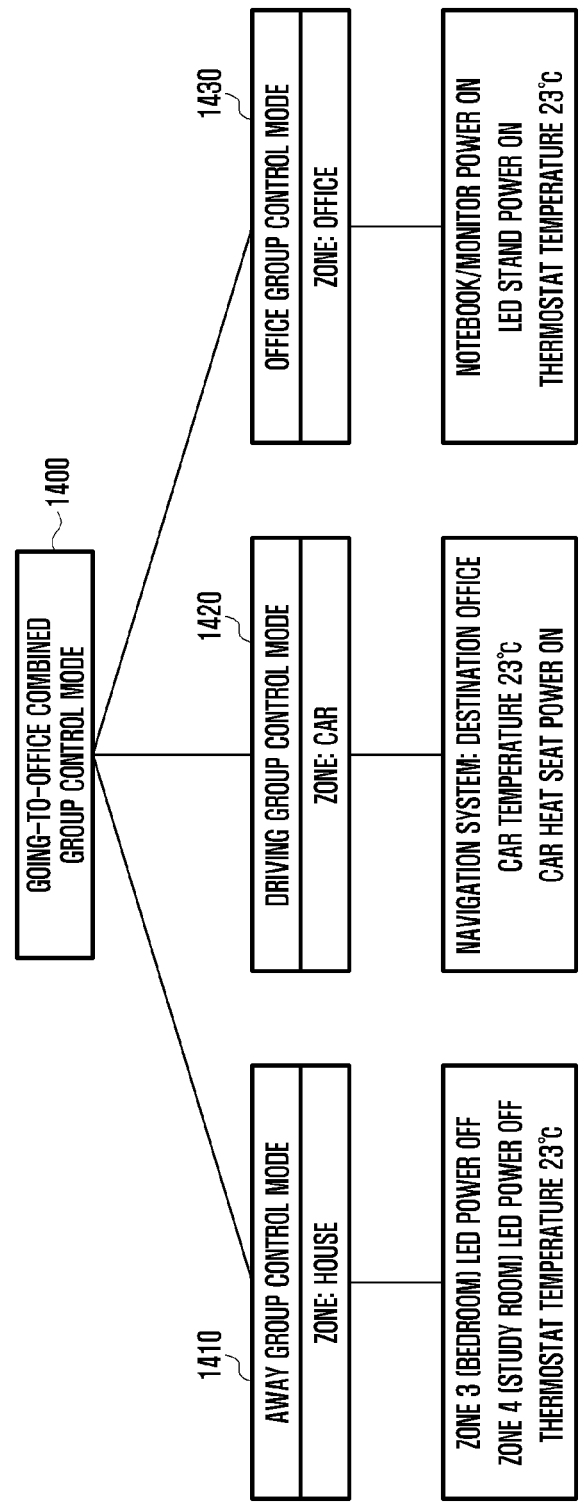
FIG. 14 illustrates an example of a combined group control mode according to an embodiment of the present disclosure.

FIG. 14 illustrates an example of a combined group control mode according to an embodiment of the present disclosure.

Referring to FIG. 14, a going-to-office combined group control mode 1400 includes an away group control mode 1410, a driving group control mode 1420, and an office group control mode 1430. The away group control mode 1410 refers to a group control mode of the house executed when the user goes to the office, the driving group control mode 1420 refers to a group control mode of a car executed while the user drives the car from the house to the office, and the office group control mode 1430 refers to a group control mode executed in the office after the user arrives at the office. The three group control modes may be executed in different places at different times, but may be grouped as the combined group control mode since they are executed according to a sequence of actions. When the user leaves the house to go to the office, the away group control mode 1410 is executed and thus LEDs in zone 3 (bedroom) and zone 4 (study room) are turned off and a setting temperature of a house thermostat is set to 23° C. When the user drives the car to the office, a destination of a navigation system is set to the office, an internal setting temperature of the car is set as 23° C., and a heating element in the seat is turned on. When the user arrives at the office, the power of a notebook and a monitor is turned on, power of an LED stand is turned on, and a temperature setting of an office thermostat is set to 23° C.

The combined group control mode may be automatically detected and executed based on a location of the user, a time, and measured information received by the server. The server receives location information measured by a location sensor such as a global positioning system (GPS) of a wireless communication terminal or a wearable device carried by the user and executes the corresponding group control mode and combined group control mode according to location movement of the user. For example, when the user drives the car to the office from the house, the server may execute the combined group control mode such as going to the office. Alternatively, the server executes the group control mode and the combined group control mode according to user's daily work or movement time by using time information. For example, when the user wakes up at 7 a.m. and leaves the house to go to the office at 7:30 a.m., the server may execute the combined group control mode 1400 according to the user's daily work. Alternatively, when the user leaves the house to visit a particular place, the server calculates a time taken to arrive at the particular place and executes the required combined group control mode at the estimated arrival time. Alternatively, when a short-range wireless communication transceiver embedded in a gateway installed in each different location detects a wireless communication terminal or a wearable device carried by the user, the server may receive information to determine the user's location information, execute the corresponding group control mode based on the user's location and sequence of the user's location, and execute the combined group control mode according to an execution order of the group control mode. For example, when the wireless communication terminal of the user is detected by the home gateway installed in the house, then detected by either a car gateway or an office gateway, the server may determine that the user is going to the office and execute the combined group control mode of going to the office.

Figure 15:
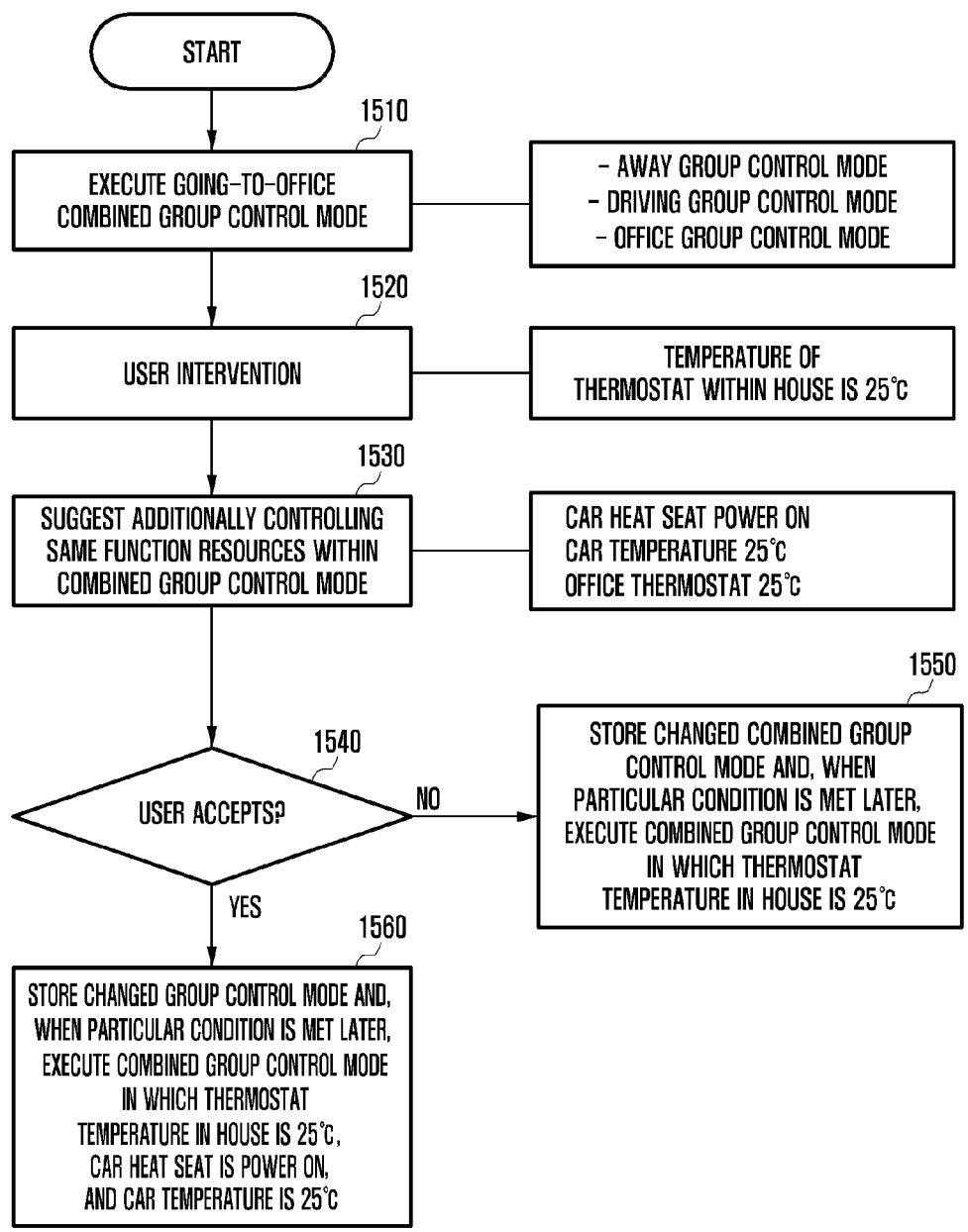
FIG. 15 illustrates an example in which a user intervenes in a combined control mode and a change is suggested in the combined control mode according to an embodiment of the present disclosure.

FIG. 15 illustrates an example in which a user intervenes in a combined control mode and a change is suggested in the combined control mode according to an embodiment of the present disclosure.

Referring to FIG. 15, when the particular condition that the user goes to the office is met, the going-to-office combined group control mode is executed at operation 1510. The going-to-office combined group control mode includes an away group control mode, a driving group control mode, and an office group control mode. At this time, under a particular condition such as a low temperature, the user changes a setting temperature of a thermostat of the house to 25° C. This corresponds to a resetting of a thermostat in the house to raise the temperature setting in the away group control mode. When the temperature is low, if the user repeatedly changes the setting temperature of the thermostat of the house to 25° C., the home gateway interworks with a car gateway and an office gateway to suggest an additional control of identical or similar function resources in the combined group control mode. Instead of the home gateway, another gateway interworking with the home gateway may provide the suggestion and receive acceptance of the suggestion. The home gateway suggests an additional control to turn on a heating element disposed in a seat of a car, set an inside temperature of the car to 25° C., and set a thermostat in the office to 25° C. at operation 1530.

The user may entirely or partially accept or may not accept the suggestion of the home gateway at operation 1540. When the user does not accept the suggestion of the home gateway, the changed combined group control mode in which user intervention is stored and the combined group control mode in which the setting temperature of the thermostat of the house is set as 25° C. is executed under a particular condition of the low temperature at operation 1550. When the user accepts the suggestion of the home gateway, the changed combined group control mode is stored. Thereafter, when the particular condition is met, the changed combined group control mode is executed to set the thermostat of the house to 25° C., turn on the heating element in the car seat, set the temperature of the car to 25° C., and set the thermostat in the office is set to 25° C.

Figure 16:
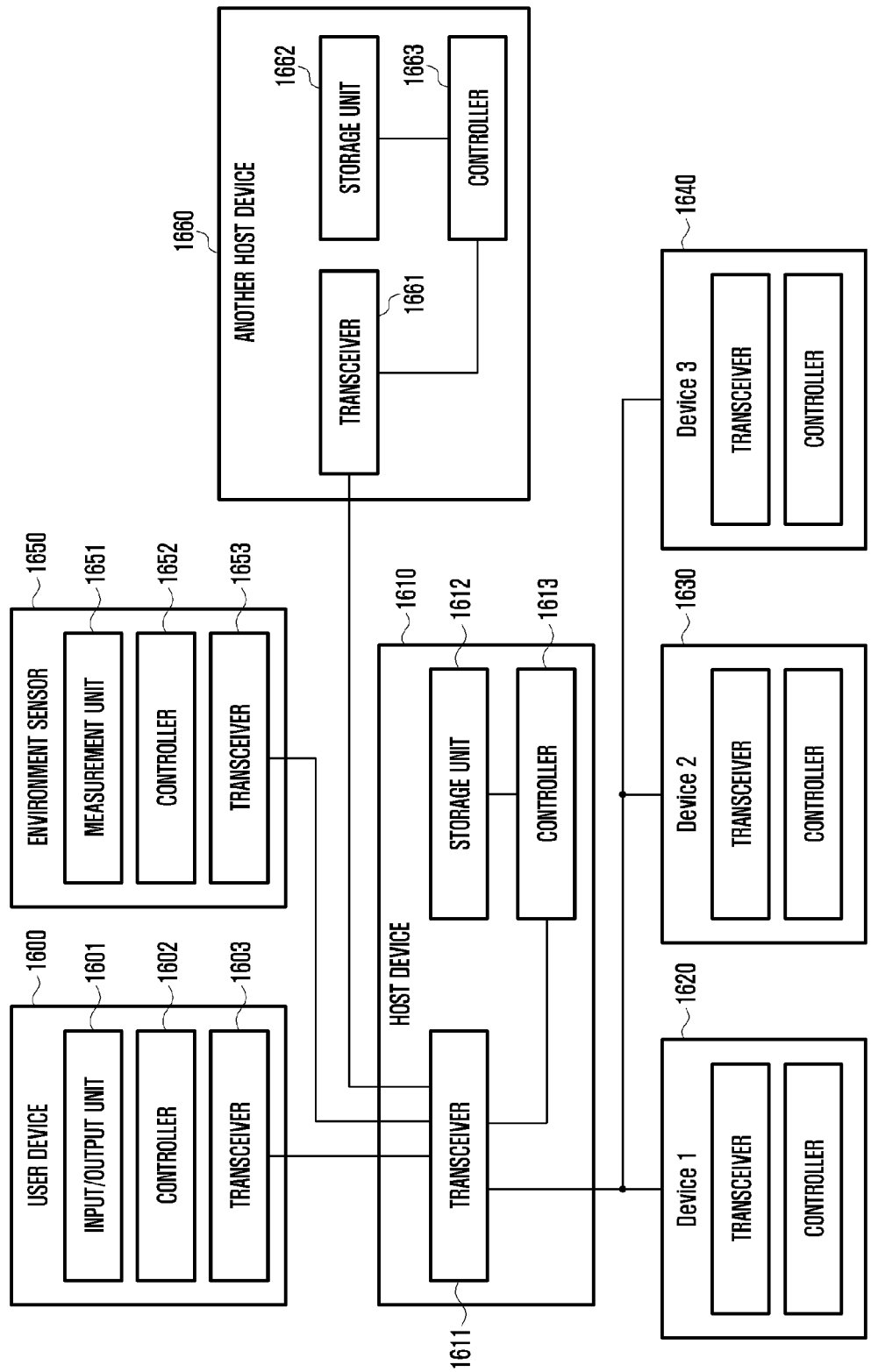
FIG. 16 is a block diagram illustrating a system according to an embodiment of the present disclosure.

FIG. 16 is a block diagram illustrating a system according to an embodiment of the present disclosure.

Referring to FIG. 16, a user device 1600 provides an interface by which the user may intervene in the group control mode or accept the suggestion of the home gateway, and may be a mobile phone or a wearable device carried by the user or a device including a display such as a TV. The user device includes an input/output unit 1601, a controller 1602, and a transceiver 1603. The input/output unit informs the user of execution of the group control mode and displays a current state of each device. When the user inputs personal information, the input/output unit 1601 informs the user of the suggestion of the changed group control mode. The transceiver 1603 transmits user intervention information and acceptance of the changed group control mode by the user to a host device 1610 and receives group control mode information and changed group control mode information. The controller 1602 controls the input unit and the transceiver.

A host device 1610 such as the home gateway, a set-top box, a home server, and a central control unit, is connected to each device and the user device to execute the group control mode, sets and controls function resources of each device, and stores and analyzes user intervention information, so as to suggest and store a new group control mode. The host device 1610 includes a transceiver 1611, a storage unit 1612, and a controller 1613. The transceiver 1611 transmits a function resource setting signal of each device to each device, transmits group control mode information to the user device, receives current state information on each device from each device, and receives user intervention information and user acceptance information from the user device. Further, the transceiver 1611 receives external environment data from an environment sensor that measures the external environment data. The storage unit 1612 stores group control mode information, user intervention information, external environment data, and changed group control mode. The controller 1613 controls the transceiver and the storage unit, and generates changed group control information suggested to the user based on the user intervention information and the external environment data.

A plurality of devices 1620, 1630, and 1640 may be connected to the host device through a wired connection or a wireless connection, and each of the devices includes a suitable transceiver and controller.

An environment sensor 1650 includes a measurement unit 1651, a controller 1652, and a transceiver 1653. The measurement unit 1651 measures external environment data, the transceiver 1652 transmits the measured external environment data to the host device, and the controller 1653 controls the measurement unit and the transceiver.

Another host device 1660 executes another group control mode, sets and controls function resources of the device connected to the other host device, and stores and analyzes user intervention information, so as to suggest and store a new group control mode. The other host device includes a transceiver 1661, a storage unit 1662, and a controller 1663, and the transceiver of the other host device may be connected to the transceiver of the host device through a wire or wirelessly to function in the combined group control mode.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of changing a group control mode using user intervention information by a home gateway, the method comprising:
   executing the group control mode for controlling functions of a group of devices according to a predetermined setting;
   determining whether a user intervention condition is met based on user intervention information generated by repeated user intervention inputs which change a function value of a first device according to the predetermined setting at the home gateway;
   analyzing, by the home gateway if the user intervention condition is met, the user intervention information and the external environment data; and
   displaying, by the home gateway to a user, a suggested changed group control mode based on the analyzed user intervention information and the external environment data.

2. The method of claim 1, further comprising:
   generating the changed group control mode based on the stored user intervention information and the external environment data.

3. The method of claim 1, wherein the changed group control mode includes a changed function setting of the first device which is changed by the user intervention inputs.

4. The method of claim 3,
   wherein the changed group control mode further includes a changed function setting of a third device, and
   wherein the changed function of the third device is similar to a function of the first device that is changed by the user.

5. The method of claim 4, further comprising receiving an input indicating whether the changed group control mode is accepted.

6. The method of claim 5, further comprising:
   if the input indicating that the changed group control mode is accepted, storing the changed group control mode; and
   if the user intervention condition is met, executing the changed group control mode.

7. The method of claim 5, further comprising: if the input indicating that the changed group control mode is not accepted, executing the changed group control mode including the changed function setting that the user has changed.

8. The method of claim 1, further comprising receiving an input indicating whether the changed group control mode is accepted or not.

9. The method of claim 8, further comprising:
if the input indicating that the changed group control mode is accepted is received, storing the changed group control mode; and
if the user intervention condition is met, executing the changed group control mode.

10. The method of claim 8, wherein, if the input indicating that the changed group control mode is not accepted is received, executing the existing group control mode.

11. The method of claim 1,
wherein the user intervention information includes an identity of the first device, a changed function of the first device, and a changed function setting value of the first device, and
wherein the external environment data includes data generated by measuring an environmental parameter influencing the functions of the first device and a state of functions of a second device that are associated with the changed function resources of the first device.

12. A home gateway for changing a group control mode by using user intervention information, the home gateway comprising:
a transceiver for transmitting and receiving information to and from at least one of a group of devices, an environment sensor, or a user device; and
at least one processor configured to control to:
execute the group control mode for controlling functions of the group of devices according to a predetermined setting,
determine whether a user intervention condition is met based on user intervention information generated by repeated user intervention inputs which change a function value of a first device according to the predetermined setting at the home gateway,
analyze, by the home gateway if the user intervention condition is met, the user intervention information and the external environment data, and
displaying, by the home gateway to a user, a suggested changed group control mode based on the analyzed user intervention information and the external environment data.

13. The home gateway of claim 12, wherein the at least one processor is further configured to
generate the changed group control mode based on the stored user intervention information and the external environment data.

14. The home gateway of claim 12, wherein the changed group control mode includes a changed function setting of the first device which is changed by the user intervention inputs.

15. The home gateway of claim 14,
wherein the changed group control mode further includes a changed function setting of a third device, and
wherein the changed function of the third device is similar to a function of the first device that is changed by the user.

16. The home gateway of claim 15, wherein the at least one processor is further configured to receive an input indicating whether the changed group control mode is accepted.

17. The home gateway of claim 16, wherein, if the input indicating that the changed group control mode is accepted, the at least one processor is further configured to:
store the changed group control mode, and
if the user intervention condition is met, execute the changed group control mode.

18. The home gateway of claim 16, wherein, if the input indicates that the changed group control mode is not accepted, the at least one processor is further configured to execute the changed group control mode including the changed function setting that the user has changed.

19. The home gateway of claim 12, wherein the at least one processor is further configured to receive an input indicating whether the changed group control mode is accepted.

20. The home gateway of claim 19, wherein, if the input indicating that the changed group control mode is accepted is received, the at least one processor is further configured to:
store the changed group control mode, and
if the user intervention condition is met, execute the changed group control mode.

21. The home gateway of claim 19, wherein, if the input indicating that the changed group control mode is not accepted is received, the at least one processor is further configured to execute the existing group control mode.

22. The home gateway of claim 12,
wherein the user intervention information includes an identity of the first device, a changed function of the first device, and a changed function setting value of the first device, and
wherein the external environment data includes data generated by measuring an environmental parameter influencing the functions of the first device and a state of functions of a second device that are associated with the changed function resources of the first device.

* * * * *